United States Patent
Lopez et al.

(10) Patent No.: US 11,722,481 B2
(45) Date of Patent: Aug. 8, 2023

(54) MULTIPLE IDENTITY PROVIDER AUTHENTICATION SYSTEM

(71) Applicant: Citrix Systems, Inc., Fort Lauderdale, FL (US)

(72) Inventors: Katia Lopez, Weston, FL (US); Joel Pineiro, Miami, FL (US); Javier Alejandro Figueroa, Miramar, FL (US); Ricardo Fernando Feijoo, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 341 days.

(21) Appl. No.: 16/669,992

(22) Filed: Oct. 31, 2019

(65) Prior Publication Data

US 2021/0136058 A1 May 6, 2021

(51) Int. Cl.
| | |
|---|---|
| *H04L 9/32* | (2006.01) |
| *H04W 12/06* | (2021.01) |
| *H04L 9/40* | (2022.01) |

(52) U.S. Cl.
CPC ................. *H04L 63/0853* (2013.01)

(58) Field of Classification Search
None
See application file for complete search history.

(56) References Cited

U.S. PATENT DOCUMENTS

| | | | |
|---|---|---|---|
| 2009/0199276 A1* | 8/2009 | Schneider | H04L 63/0815 726/5 |
| 2011/0219427 A1* | 9/2011 | Hito | H04L 63/18 726/3 |
| 2016/0087957 A1* | 3/2016 | Shah | H04L 63/205 726/1 |
| 2017/0279795 A1* | 9/2017 | Redberg | H04L 63/0861 |
| 2018/0077144 A1* | 3/2018 | Gangawane | H04L 63/102 |
| 2018/0351944 A1* | 12/2018 | Cho | H04L 9/3228 |
| 2019/0319946 A1 | 10/2019 | Fan | |

\* cited by examiner

*Primary Examiner* — Nicholas R Taylor
*Assistant Examiner* — Ho T Shiu

(57) ABSTRACT

Methods and systems for authentication using multiple identity providers are described herein. A first identity provider may receive, e.g., from a second identity provider, an indication of an authentication request. The first identity provider may retrieve, from a storage device, session information associated with the request. The first identity provider may authenticate, using one or more first functions, based on the session information, and based on authentication credentials received from a user, the user. Based on the authentication, the first identity provider may modify the session information. The second identity provider may authenticate, based on the session information and using one or more second functions, the user. The one or more second functions may comprise providing the user a token based on the session information. The session information may be subsequently deleted.

20 Claims, 4 Drawing Sheets

MULTIPLE IDENTITY PROVIDER AUTHENTICATION SYSTEM

FIELD

Aspects described herein generally relate to computer networking, remote computer access, virtualization, enterprise mobility management, and hardware and software related thereto. More specifically, one or more aspects describe herein relate to user authentication by different identity providers.

BACKGROUND

Computing devices rely on authentication to ensure that only certain users have access to certain content and/or services. For example, a user may use a username and password to access a remote desktop application. Authentication may be performed using one or more functions that are, e.g., associated with one or more authentication protocols. For example, a website may use one or more functions of a first authentication protocol to authenticate a user, whereas a different website may use one or more different functions of a different authentication protocol to authenticate the same user.

Because of the wide variety of authentication protocols available, it may be difficult to modify an existing service that performs one or more functions of a first authentication protocol to perform one or more functions of a different authentication protocol. For example, costs (both financial and in terms of programmer time) to ensure such compliance may be prohibitive.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards authenticating a user using both a first identity provider and a second identity provider.

A user may transmit a request for authentication to a first identity provider application executing on a first computing device. The request for authentication may be, e.g., the user accessing a particular web page or Uniform Resource Locator (URL), such as a login page. The first identity provider application may be associated with a first set of functions, e.g., those associated with a first authentication protocol. The first identity provider application may send, to a second identity provider application, an indication of the request. The second identity provider application may be associated with a second set of functions, e.g., those associated with a second authentication protocol different from the first authentication protocol. The first identity provider application may create, e.g., in a storage device, a session associated with the request. That session may comprise session data, such as information identifying a user, a device used by the user. The session data may be identified by a unique string or other identifier. The second identity provider application may retrieve, using such an identifier, the session associated with the request. The second identity provider application may receive, from the user, authentication credentials, such as a username and password. The second identity provider application may authenticate the user based on the authentication credentials, e.g., using one or more of the second set of functions. Based on authenticating the user, the second identity provider application may modify the session data. The first identity provider application may retrieve the modified session data and authenticate, based on the modified session data and, e.g., using one or more of the first set of functions, the user. The one or more of the first set of functions may comprise providing, to a device associated with the user, a token based on the session data. A user may thereby use authentication data associated, e.g., with the second identity provider to access one or more functions associated with the first identity provider. For example, this process may allow for identity federation, such that existing authentication data may be used across different services.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards authentication of one or more users. Systems may perform one or more functions (e.g., functions associated with an authentication protocol) to authenticate users prior to providing those users access to services. For example, a user may be required to log in to a website using authentication credentials to access subscriber-only content. Different identity providers may require different types of authentication credentials, may be associated with different levels of security, and may be implemented for different purposes. For example, a high-security authentication protocol may use two-factor authentication and other methods of additionally verifying a user's identity, whereas other authentication protocols might permit users to access one or more services by simply entering in a shared password. Because the functions used by different identity providers can be different, modifying an identity provider that can perform one or more first functions (e.g., to use a first authentication protocol) to perform one or more second functions (e.g., to use a different authentication protocol) can be time-consuming, expensive, and in some circumstances may introduce security vulnerabilities. Thus, for example, an organization with computing devices using one or more functions associated with the Kerberos authentication protocol may wish to use one or more functions associated with the OAuth authentication protocol; however, the costs (both in terms of programmer time and in terms of financial cost) may be too high to warrant implementing such functionality.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Computing Architecture

Figure 1:
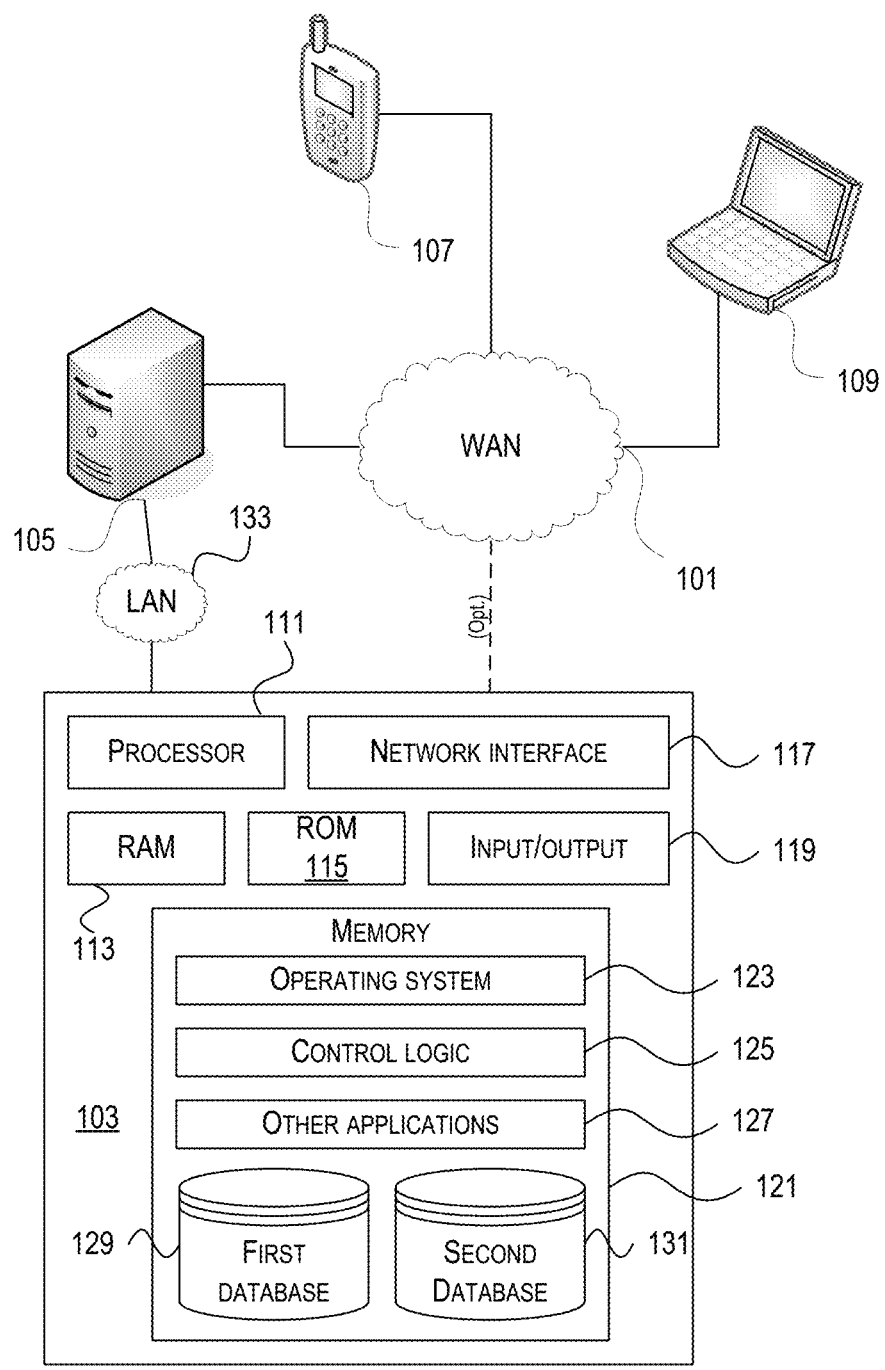
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
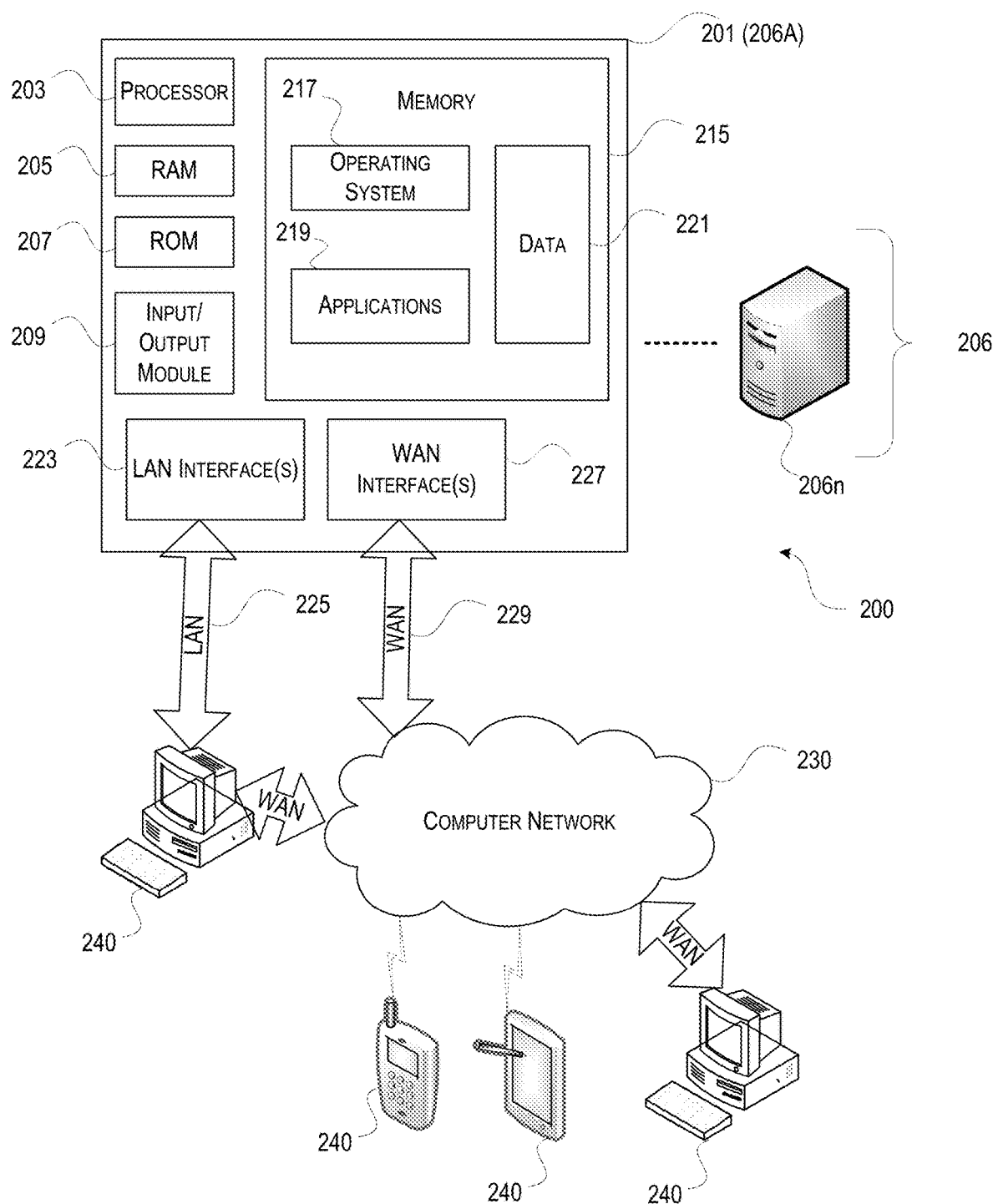
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Multiple Identity Provider Authentication

Figure 3:
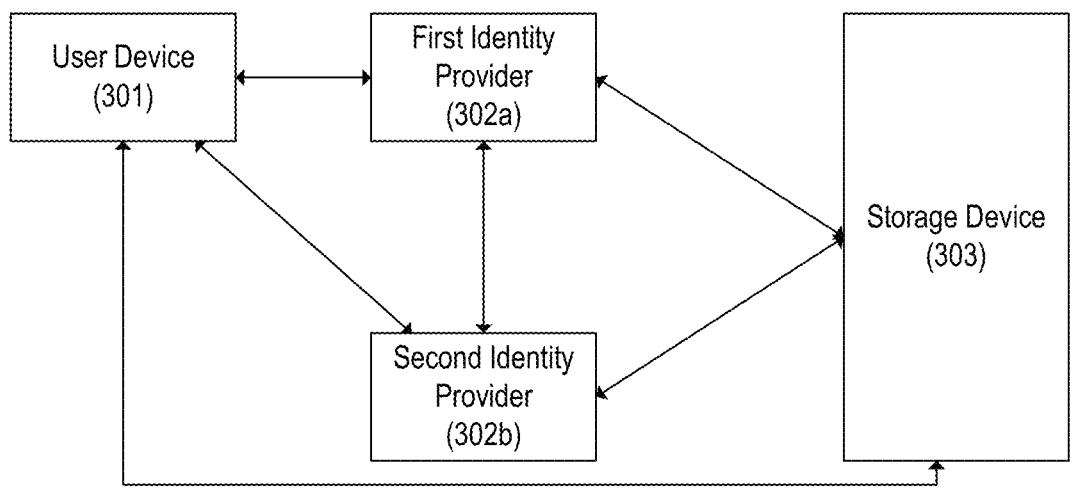
FIG. 3 depicts relationships between a user device, identity providers, and a storage device.

FIG. 3 depicts relationships between a user device 301, a first identity provider 302a, a second identity provider 302b, and a storage device 303. Though only a single user device (the user device 301), two identity providers (the first identity provider 302a and the second identity provider 302b), and a single storage device (the storage device 303) are shown in FIG. 3, any number of such elements may be implemented. For example, five different identity providers may be implemented. One or more of the elements shown in FIG. 3 may be one or more computing devices and/or may be applications executing on one or more computing devices. One or more of the elements shown in FIG. 3 may be all or portions of the network nodes 103, 105, 107, and 109 of FIG. 1. For example, the first identity provider 302a may execute on the device 109, the second identity provider may execute on the web server 105, and the storage device 303 may comprise a Structured Query Language (SQL) application executing on the web server 105 and/or memory on one or more of the network nodes 103, 105, 107, and 109. As another example, both the user device 301 and the first identity provider 302a may be the same or a similar computing device, such as a personal laptop, and the storage device 303 may be memory on that same or similar computing device. All such elements may be interconnected via, e.g., the computer network 230. Additionally and/or alternatively, all or some of the elements depicted in FIG. 3 may be interconnected in that they execute on the same computing device.

The user device 301 may be one or more computing devices associated with a user, such as a laptop, desktop, smartphone, or the like. The user may have authentication credentials which may be provided, via the user device 301, to one or more identity providers. For example, the user device 301 may be a smartphone capable of entering a username and password into login fields provided by a website associated with the first identity provider 302a. The user device 301 may store the authentication credentials such that, for example, a user may provide authentication credentials by instructing the user device 301 to retrieve the authentication credentials from storage and transmit them to an identity provider.

Identity providers, such as the first identity provider 302a and the second identity provider 302b, may be one or more applications executing on computing devices (e.g., the same or different from the user device 301 and/or the storage device 303) which maintain identity information associated with users and/or authenticate one or more users based on authentication credentials and/or using one or more functions (e.g., as specified by an authentication protocol). An identity provider may additionally and/or alternatively be configured to create and/or cause storage (e.g., in the storage device 303) of session data, which may comprise information about a user. For example, responsive to authenticating a user, the first identity provider 302a may create session data indicating that the user has been authenticated. Identity providers may authenticate users prior to permitting such users to access one or more services, such as a portion of a website, intranet services, access to remote applications (e.g., executing on a remote server), or the like. For example, responsive to authenticating the user, the second identity provider may generate a cookie for use by the user device 301 to browse a members-only website. Session data may additionally be referred to as session information, a session, or the like.

Authentication credentials may be any information used to authenticate a user. For example, authentication credentials may comprise a username, password, two-factor authentication string, shared password (e.g., a password shared with multiple employees in a company), a certificate (e.g., an encrypted certificate stored in a Universal Serial Bus key and inserted into the user device 301 for transmission to one or more identity providers), or the like.

The one or more functions used by identity providers, such as the first identity provider 302a and the second identity provider 302b, may be any steps which may be taken by the identity providers relating to authentication of one or more users. The one or more functions may be based on standards, rules, and/or settings for authentication of a user, e.g., using authentication credentials. The one or more functions may be associated with an authentication protocol. Examples of authentication protocol include the OAuth authentication protocol and the Kerberos authentication protocol. The one or more functions may relate to how communication flows for authentication should be performed. The one or more functions may relate to what type, quantity, or quality of authentication credentials are required. Different identity providers may use one or more different functions. For example, the first identity provider 302a may use a first version of the OAuth authentication protocol that is associated with one or more first functions, and the second identity provider 302b may use a different version of the OAuth authentication protocol associated with one or more second functions, and there may be some similarity between the one or more first functions and the one or more second functions. Two different versions of an authentication protocol might not be interoperable, such that, e.g., authentication credentials which may be used with the first identity provider 302a might not be usable with the second identity provider 302b, even if both provide access to the same or a similar service.

Storage devices, such as the storage device 303, may be one or more devices configured to store session data related to processes performed by identity providers, such as the first identity provider 302a and the second identity provider 302b. Though the term storage device is used, the storage device need not be a particular type of storage, and the storage device need not be separate from other devices shown in FIG. 3. For example, a storage device may comprise memory common to a computing device executing both the first identity provider 302a and the second identity provider 302b. The storage device may be trusted by identity providers. An identity provider may generate and/or modify session data stored by the storage device 303 responsive to authenticating a user. Session data may indicate, for example, information about a user, such as their e-mail address, first name, last name, or the like. Session data may additionally and/or alternatively comprise information about authentication processes performed by an identity provider, such as whether a user was authenticated, what function(s) were performed and/or what authentication protocol(s) were used, what time the user was authenticated, or the like. Session data may correspond to one or more unique identifiers of the session data, such that multiple applications and/or computing devices may access session data using a unique identifier. Session data stored by the storage device 303 may be modified by identity providers based on authentication activity. For example, session data indicating that a user was authenticated by the first identity provider 302a may be modified, after the second identity provider 302b authenticates the user, to indicate that the user has also been authenticated by the second identity provider 302b.

Session data may be used by identity providers, such as the first identity provider 302a and the second identity provider 302b, to generate tokens (e.g., cookies) to provide to the user device 301. The tokens may be associated with and/or may comprise session data (e.g., stored by the storage device 303). For example, a token may comprise a cookie with a unique identifier which may be used by services (e.g., a website) to access session data (e.g., stored by the storage device 303). The token may be any form or type of data. For example, the token may be a text string, a file, or the like.

Figure 4:
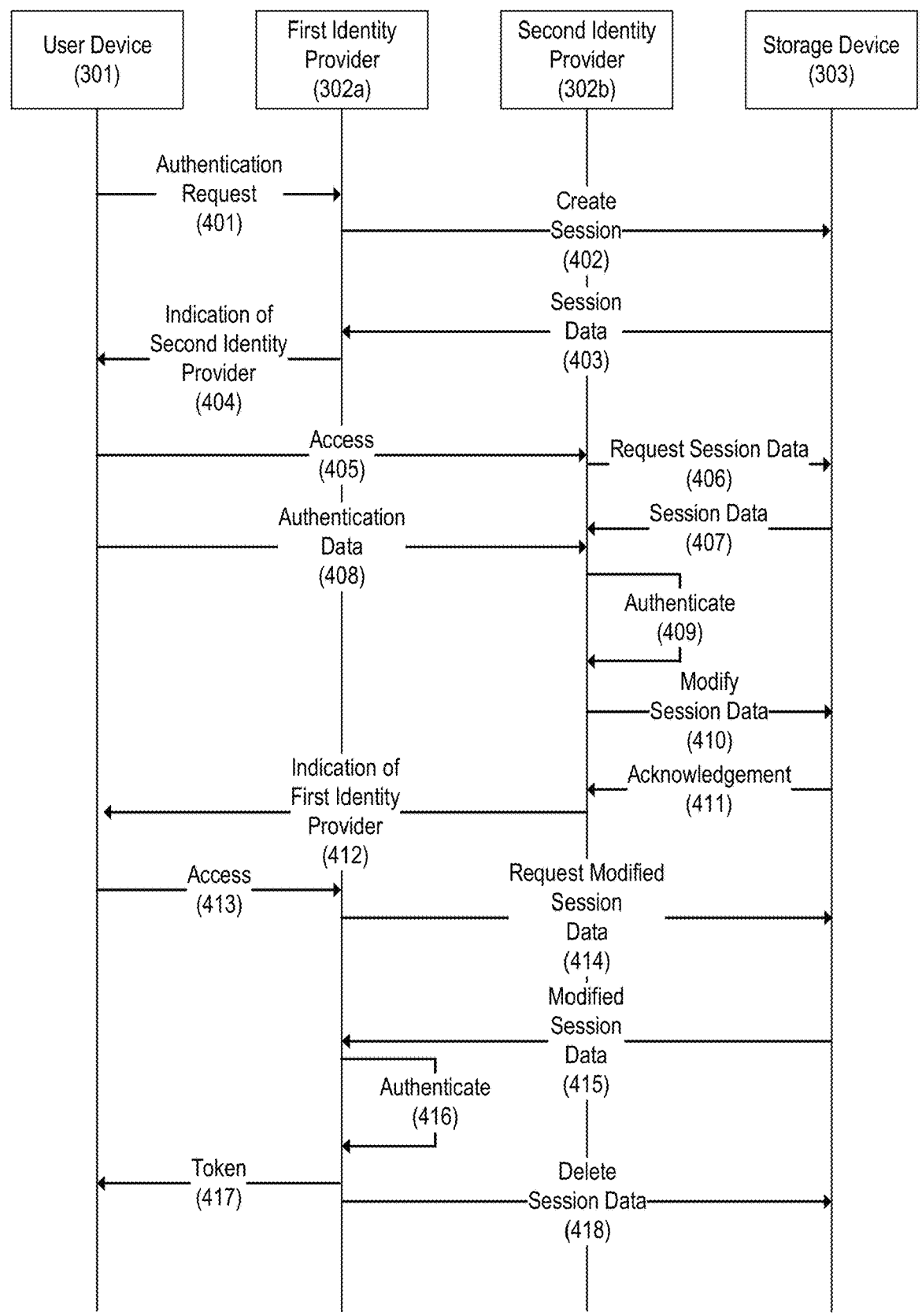
FIG. 4 depicts a sequence diagram with steps which may be taken with respect to a user device, identity providers, and a storage device.

FIG. 4 depicts a sequence diagram with steps which may be taken with respect to the user device 301, the first identity provider 302a, the second identity provider 302b, and the storage device 303. The sequence diagram shown in FIG. 4 starts at step 401 and proceeds downward, with each arrow representing an interaction between two devices. Though single arrows are shown for each interaction, multiple steps (e.g., processing, transmission of a message by a sender, transmission of an acknowledgement message by a recipient) may be performed for each arrow. Moreover, one or more steps depicted in FIG. 4 may be skipped if desired. For example, the token sent in step 417, as described below, might not be sent in certain circumstances. As another example, many of the steps shown involving the storage device 303 may be simplified by, e.g., sharing memory between the first identity provider 302a and the second identity provider 302b, such that step 411 (involving acknowledgement that session data has been modified) need not be performed.

In step 401, the user device may transmit an authentication request to the first identity provider 302a. An authentication request need not comprise authentication credentials, but may instead be any indication that a user may request authentication. The indication may be access, by a user, of a web page or particular URL. For example, the authentication request may comprise a user accessing a login page for a website or similar service. The authentication request may be predictive of user behavior relating to authentication. For example, if certain steps (e.g., by a user using a first application) typically precede a user transmitting authentication credentials, the detection of those steps (e.g., by a second application configured to monitor the user's use of the first application) may be considered an authentication request, and an indication of such steps may be transmitted to the first identity provider 302a. As part of step 401, the authentication request may be validated. For example, if the authentication request is associated with one or more strings (e.g., query strings in a URL), then the strings may be validated. In this manner, the veracity and/or reliability of the authentication request may be confirmed before additional steps are taken.

In step 402, the first identity provider 302a may cause creation of a session (e.g., session data). The session may be created and stored, e.g., at the storage device 303. The session data may indicate preliminary authentication information about a user associated with the user device 301, such that the user of the user device 301 is likely to transmit authentication credentials. The session data created in step 402 may comprise an indication of the user device 301, an indication of one or more functions (e.g., as associated with an authentication protocol) associated with authentication credentials likely to be received by the user device 301 (e.g., that the user is likely to transmit a username and password compliant with a particular Kerberos implementation), a time associated with receiving the authentication request, or the like. The session data may be used to transmit, e.g., between different identity providers, information about authentication of a user of the user device 301.

In step 403, acknowledgment of the session data may be received by the first identity provider 302a and, e.g., from the storage device 303. The acknowledgement may comprise all or portions of the session data. The acknowledgement may additionally and/or alternatively comprise information relating to the session data, such as a unique identifier of the session data.

In step 404, the first identity provider 302a may transmit, to the user device 301, an indication of the second identity provider 302b. The indication of the second identity provider 302b may be transmitted to the user device 301 responsive to an indication that the authentication request should be handled by the second identity provider 302b. For example, an authentication request by a user may indicate that a user will provide Kerberos-compliant authentication credentials, the first identity provider 302a may provide OAuth-based authentication, and the second identity provider 302b may provide Kerberos-based authentication, such that the second identity provider 302b should handle the authentication requested by the user. The indication of the second identity provider 302b may be a redirect to a URL associated with the second identity provider 302b. For example, the indication may comprise a redirect to a web page associated with the second identity provider 302b, such that a web browser executing on the user device 301 may be caused to access the web page. The indication of the second identity provider 403b may comprise an indication of the session data. For example, the indication of the second identity provider 302b may comprise a first indication of the second identity provider 302b and a second indication of a unique identifier associated with the session data created in step 402.

In step 405, in response to the indication of the second identity provider 302b, the user device 301 may access the second identity provider 302b. Such access may be responsive to a redirect, or other similar code on the user device 301. Though access is shown as separate in step 405, because the first identity provider 302a and the second identity provider 302b may be on the same or similar computing device, access may comprise accessing a different part of the same computing device (e.g., a different URL of the same website on the same server).

In step 406, the second identity provider 302b may request the session data. The session data may be requested from, e.g., the storage device 303. The second identity provider 302b may use a unique indication of the session data (e.g., as received as part of step 405) to request the session data. For example, the second identity provider 302b may look for session data stored in the storage device 303 that is associated with the user device 301.

In step 407, the second identity provider 302b may receive, e.g., from the storage device 303, the session data. The session data received in step 407 may be the same or similar to that created in step 402. While steps involving the storage device (e.g., requesting the session data in step 406 and receiving the session data in step 407) are shown, the first identity provider 302a and/or the second identity provider 302b may be capable of simply retrieving, without request, the session data, with or without involvement of the storage device 303.

In step 408, the second identity provider 302b may receive, from the user device 301, authentication data. The authentication data received may be used by one or more functions (e.g., one or more functions associated with an authentication protocol) of the second identity provider 302b. For example, if the second identity provider 302b uses the Kerberos authentication protocol, then the authentication data may be configured for one or more functions related to Kerberos authentication. The authentication data received in step 408 may be configured to be used with one or more second functions of a second authentication protocol of the second identity provider 302b, but might not be configured for use with one or more first functions of a first authentication protocol of the first identity provider 302a. For example, the authentication data received in step 408 might be a username and password configured for use with the second identity provider 302b, but no other identity providers.

In step 409, based on the received authentication data, one or more functions, and/or one or more authentication protocols, the second identity provider 302b may authenticate a user of the user device 301. The method in which the authentication data is used, and the manner in which a user is authenticated, may depend on the one or more functions (e.g., of one or more authentication protocols) implemented by the second identity provider 302b. As such, many different steps may be taken as part of step 409 in accordance with one or more functions.

In step 410, based on the authentication in step 409, the second identity provider 302b may modify the session data. Though described as modifying the session data, all or portions of the session data need not be replaced. For example, modification of the session data may comprise adding, to the session data, information about the authentication performed by the second identity provider 302b. For example, user information associated with an account stored by the second identity provider 302b may be added to the session data. As another example, an indication of authentication based on one or more authentication protocols associated with the second identity provider 302b may be added to the session data. By modifying the session data, the second identity provider 302b may provide information about one or more authentication steps performed by the second identity provider 302b. For example, the session data may be modified to indicate how a user was authenticated, what time the user was authenticated, how secure the user's password was, or the like.

In step 411, the storage device 303 may send, to the second identity provider 302b, an acknowledgement that the session data has been modified. The acknowledgement may be as simple as an acknowledgement or may comprise the entire session data. In some circumstances, the acknowledgement need not be sent to the second identity provider 302b.

In step 412, the second identity provider 302b may send, to the user device 301, an indication of the first identity provider 302a. The indication of the first identity provider 302a may comprise, for example, a 302 redirect which causes a web browser executing on the user device 301 to go to a web page associated with the first identity provider 302a. The indication of the first identity provider 302a may comprise an indication of the second identity provider 302b and/or the session data stored on the storage device 303. For example, the 302 redirect may comprise a formatted URL that includes a string uniquely associated with session data (e.g., as stored by the storage device 303). In this way, the user device 301 may later provide, to the first identity provider 302a, information allowing the first identity provider 302a to retrieve the modified session data.

In step 413, the user device 301 may access the first identity provider 302a. The user device 301 may be configured to access the first identity provider 302a in a different way (e.g., by providing variables associated with session data, by accessing a different portion of the first identity provider 302a) to distinguish access in step 413 from the authentication request in step 401 and/or indicate that the user device 301 has been authenticated by the second identity provider 302b. In this manner, the first identity provider 302a may determine that the access relates to an existing authentication request (e.g., the authentication request in step 401). During this process, the user device 301 may provide the first identity provider 302a information relating to the modified session data. In this manner, as described below, the first identity provider may retrieve, e.g., from the storage device, the modified session data.

In step 414, in response to the access in step 413, the first identity provider 302a may request, e.g., from the storage device 303, the modified session data. The request may comprise an indication of the modified session data, which the first identity provider 302a may have received as part of step 413. The request need not be for all session data. For example, the request may indicate which portions, of one or more portions of the session data, should be provided by the storage device. For example, the first identity provider 302a might not need information about when the user was authenticated by the second identity provider 302b, but might need information about what steps the second identity provider 302b took to authenticate the user in order to determine what additional steps to take to authenticate the user. For example, the first identity provider 302a may seek an indication of whether the user device 301 was authenticated by the second identity provider 302b in the modified session data.

In step 415, in response to the request in step 414, the first identity provider 302a may receive, e.g., from the storage device 303, the modified session data. The modified session data received in step 415 may be based on the request transmitted in step 414. For example, if only a user's e-mail is requested in step 414, then only the user e-mail might be transmitted in step 415.

In step 416, based on the modified session data, the first identity provider 302a may authenticate a user of the user device 301. The authentication performed in step 416 may be based on the authentication performed in step 409. The authentication performed in step 416 may use one or more first functions, and the authentication performed in step 409 may use one or more second functions. The one or more first functions and the one or more second functions may have similarities. For example, the one or more first functions may be a subset of the one or more second functions. Based on the authentication in step 409 as indicated by the modified session data, one or more steps for authentication in step 416 may be skipped. For example, based on the modified session data indicating that a user successfully authenticated with the second identity provider 302b using one or more second functions (e.g., associated with a second authentication protocol), the user may be authenticated by the first identity provider using one or more first functions (e.g., associated with a first authentication protocol) without requiring that the user provide additional authentication credentials (e.g., in addition to those already provided in step 408).

In step 417, the first identity provider 302a may provide, to the user device 301, a token (e.g., a cookie). Providing the token may be part of the one or more functions associated with the first identity provider 302a. The token may be used by the user device 301 to access content and/or services. The token may be based on the session data. For example, the token may comprise a unique identifier of the session data stored by the storage device 303, such that the token may be used to later access the session data (and, e.g., verify that a particular user was authenticated). The token may not be provided if, for example, other methods of providing a user of the user device 301 access to one or more services are available. For example, rather than providing the token, the first identity provider 302a may cause a content server to transmit, to the user device 301, data associated with content requested as part of the authentication request in step 401.

In step 418, the first identity provider 302a may cause the session data to be deleted (e.g., from the storage device 303). Deletion of the session data may advantageously prevent unnecessary storage of information identifying a user. Deleting the session data need not occur immediately after the first identity provider 302a no longer needs the session data. For example, the session data may be stored for a predetermined period of time such that it might be used by other identity providers to facilitate further authentication.

Though depicted in different elements in, e.g., FIGS. 3 and 4, the authentication steps shown in FIG. 4 need not be apparent to a user (e.g., of the user device 301). From a user's perspective, the first identity provider 302a and the second identity provider 302b may be the same or similar, such that authentication steps (such as providing the authentication data in step 408) may appear to be communicating with the same or a similar device.

The process depicted in FIG. 4 may allow users to use authentication data in a variety of circumstances. For example, the process shown in FIG. 4 may be used for identity federation. The process shown in FIG. 4 may allow a user to use existing authentication data (e.g., for the second identity provider 302b) for different services, such as those associated with the first identity provider 302a. As a particularized example, the process used in FIG. 4 may be used to permit a user to use authentication credentials for a first website to perform authentication steps to access a second website.

The process depicted in FIG. 4 may be implemented in various environments, such as an enterprise mobility management system. As an example, an enterprise may have previously used an authentication system corresponding to the second identity provider 302b (e.g., a legacy system), but may wish to implement an authentication system allowing users to authenticate via the first identity provider 302a (e.g., a new, OAuth-based system). The authentication request sent in step 401 may correspond to a request for authentication in the enterprise mobility management system. The session created in step 402 and the session data returned in step 403 may be stored in an existing database (e.g., which may act as the storage device 303) used by the enterprise mobility management system. For example, the storage device 303 may be a user database maintained as part of the enterprise mobility management system. The indication of the second identity provider in step 404 may be an internal redirect to a page associated with the second identity provider 302b in the enterprise mobility management system. The authentication process in steps 405 through 417 may similarly correspond to authentication of a user in an enterprise mobility management system, such that the token sent in step 417 may be associated with providing a user access to mobile computing services. In this way, the process depicted in FIG. 4 may be used to federate authentication and/or extend the functionality of authentication in, e.g., an enterprise mobility management system.

The following paragraphs (M1) through (M14) describe examples of methods that may be implemented in accordance with the present disclosure.

(M1) A method comprising: receiving, by a first identity provider application executing on a first computing device, an indication of an authentication request from a second computing device; retrieving, by the first identity provider application and from a storage device, session information associated with the authentication request; receiving, by the first identity provider application and from the second computing device, authentication credentials; authenticating, based on the session information, based on the authentication credentials, and by performing one or more first functions, a user; modifying, by the first identity provider application and in response to the authenticating, the session information; and causing a second identity provider application to authenticate, based on the modified session information, the user by performing one or more second functions different than the one or more first functions.

(M2) A method may be performed as described in paragraph (M1) wherein the one or more first functions correspond to a first authentication protocol, and wherein the one or more second functions correspond to a second authentication protocol different from the first authentication protocol.

(M3) A method may be performed as described in any of paragraphs (M1) through (M2) wherein modifying the session information comprises: determining user information associated with the user; and adding, to the session information, the user information.

(M4) A method may be performed as described in paragraph (M3) wherein causing the second identity provider application to authenticate the user comprises: causing the second identity provider to authenticate the user based on the user information (M5) A method may be performed as described in any of paragraphs (M1) through (M4) further comprising: deleting, in response to determining that the second identity provider application authenticated the user, the modified session information from the storage device.

(M6) A method may be performed as described in any of paragraphs (M1) through (M5) wherein causing the second identity provider application to authenticate the user comprises: causing the second identity provider to provide, to the user, a token, wherein the token comprises at least a portion of the session information.

(M7) A method may be performed as described in any of paragraphs (M1) through (M6) wherein the indication of the authentication request corresponds to access, by the user, of a Uniform Resource Locator (URL).

(M8) A method may be performed as described in any of paragraphs (M1) through (M7) wherein causing the second identity provider to authenticate the user comprises transmitting, to the second computing device, a second indication of a URL associated with the second identity provider, wherein access, by the second computing device, of the URL causes the second identity provider to authenticate the user.

(M9) A method may be performed as described in any of paragraphs (M1) through (M8) wherein the second identity provider application executes on a third computing device.

(M10) A method comprising receiving, by a first identity provider application executing on a first computing device and from a second computing device, an authentication request; sending, to a second identity provider application, a first indication of the authentication request; receiving, from the second identity provider application, a second indication that a user has been authenticated based on a second authentication protocol; retrieving, from a storage device, session information associated with authentication, by the second identity provider application and based on the second authentication protocol, of the user; and authenticating, by the first identity provider application, based on the session information, and based on a first authentication protocol, the user.

(M11) A method may be performed as described in paragraph (M10) wherein sending the first indication of the authentication request comprises causing the second computing device to access a URL associated with the second identity provider application.

(M12) A method may be performed as described in any of paragraphs (M10) through (M11) wherein authenticating the user comprises generating, based on the session information, a token; and sending, to the second computing device, the token.

(M13) A method may be performed as described in any of paragraphs (M10) through (M12) further comprising: deleting, after authenticating the user, the session information.

(M14) A method may be performed as described in any of paragraphs (M10) through (M13) wherein sending the first indication of the authentication request comprises storing, based on the authentication request, the session information in the storage device, wherein the second identity provider application is configured to modify the session information after authenticating the user based on the second authentication protocol.

The following paragraphs (S1) through (S6) describe examples of systems that may be implemented in accordance with the present disclosure.

(S1) A system comprising: a first identity provider application executing on a first computing device; and a second identity provider application executing on a second computing device; wherein the first identity provider application is configured to: receive an indication of an authentication request; retrieve, from a storage device, session information associated with the authentication request; receive, from a third computing device, authentication credentials; authenticate, based on the session information, based on the authentication credentials, and by performing one or more first functions, a user; and modify, in response to the authenticating, the session information; and wherein the second identity provider application is configured to: authenticate, based on the modified session information and by performing one or more second functions different than the one or more first functions, the user.

(S2) A system as described in paragraph (S1) wherein the second identity provider application is further configured to: receive the authentication request; cause storage, by the storage device, of session information associated with the authentication request; and transmit, to the first identity provider application, the indication of the authentication request.

(S3) A system as described in any of paragraphs (S1) through (S2) wherein the one or more first functions correspond to a first authentication protocol, and wherein the one or more second functions correspond to a second authentication protocol different from the first authentication protocol.

(S4) A system as described in any of paragraphs (S1) through (S3) wherein the first identity provider application is configured to modify the session information by: determining user information associated with the user; and adding, to the session information, the user information.

(S5) A system as described in paragraph (S4) wherein the second identity provider application is configured to authenticate the user based on the user information.

(S6) A system as described in any of paragraphs (S1) through (S5) wherein the second identity provider application is configured to authenticate the user by sending, to the user, a token, wherein the token comprises at least a portion of the session information.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
   a first identity provider application executing on a first computing device; and
   a second identity provider application executing on a second computing device;
   wherein the first identity provider application is configured to:
      receive an indication of an authentication request;
      retrieve, from a storage device, session information associated with the authentication request;
      receive, from a third computing device, authentication credentials;
      authenticate, based on the session information, based on the authentication credentials, and by performing one or more first functions of a first authentication protocol, a user; and
      modify, in response to the authenticating, the session information to store an identification of the one or more first functions of the first authentication protocol used to authenticate the user; and
   wherein the second identity provider application is configured to:
      determine a first level of security based on the identification of the one or more first functions of the first authentication protocol stored in the session information;
      determine a plurality of second functions of a different authentication protocol for authenticating the user;
      determine a second level of security based on the plurality of second functions;
      determine, based on the difference between the one or more first functions of the first authentication protocol and the plurality of second functions, wherein the first level of security is different from the second level of security, and based on determining that at least a portion of the one or more first functions of the first authentication protocol satisfy the second level of security associated with the different authentication protocol, a subset of the plurality of second functions of the different authentication protocol for authenticating the user; and
      authenticate, based on the modified session information and by performing the subset of the plurality of second functions, the user.

2. The system of claim 1, wherein the second identity provider application is further configured to:
   receive the authentication request;
   cause storage, by the storage device, of session information associated with the authentication request; and
   transmit, to the first identity provider application, the indication of the authentication request.

3. The system of claim 1, wherein the first authentication protocol comprises a different version of the different authentication protocol.

4. The system of claim 1, wherein the first identity provider application is configured to modify the session information by:
   determining user information associated with the user; and
   adding, to the session information, the user information.

5. The system of claim 4, wherein the second identity provider application is configured to authenticate the user based on the user information.

6. The system of claim 1, wherein the second identity provider application is configured to authenticate the user by:
   sending, to the user, a token, wherein the token comprises at least a portion of the session information.

7. A method comprising:
   receiving, by a first identity provider application executing on a first computing device, an indication of an authentication request from a second computing device;
   retrieving, by the first identity provider application and from a storage device, session information associated with the authentication request;
   receiving, by the first identity provider application and from the second computing device, authentication credentials;
   authenticating, based on the session information, based on the authentication credentials, and by performing one or more first functions of a first authentication protocol, a user;
   modifying, by the first identity provider application and in response to the authenticating, the session information to store an identification of the one or more first functions of the first authentication protocol used to authenticate the user;
   determining a first level of security based on the identification of the one or more first functions of the first authentication protocol stored in the session information;
   determining a plurality of second functions of a different authentication protocol for authenticating the user;
   determine a second level of security based on the plurality of second functions;
   determining, based on the difference between the one or more first functions of the first authentication protocol and the plurality of second functions, wherein the first level of security is different from the second level of security, and based on determining that at least a portion of the one or more first functions of the first authentication protocol satisfy the second level of security associated with the different authentication protocol, a subset of the plurality of second functions of the different authentication protocol for authenticating the user; and
   causing a second identity provider application to authenticate, based on the modified session information, the user by performing the subset of the plurality of second functions.

8. The method of claim 7, wherein the first authentication protocol comprises a different version of the different authentication protocol.

9. The method of claim 7, wherein modifying the session information comprises:
  determining user information associated with the user; and
  adding, to the session information, the user information.

10. The method of claim 9, wherein causing the second identity provider application to authenticate the user comprises:
  causing the second identity provider to authenticate the user based on the user information.

11. The method of claim 7, further comprising:
  deleting, in response to determining that the second identity provider application authenticated the user, the modified session information from the storage device.

12. The method of claim 7, wherein causing the second identity provider application to authenticate the user comprises:
  causing the second identity provider to provide, to the user, a token, wherein the token comprises at least a portion of the session information.

13. The method of claim 7, wherein the indication of the authentication request corresponds to access, by the user, of a Uniform Resource Locator (URL).

14. The method of claim 7, wherein causing the second identity provider to authenticate the user comprises:
  transmitting, to the second computing device, a second indication of a URL associated with the second identity provider, wherein access, by the second computing device, of the URL causes the second identity provider to authenticate the user.

15. The method of claim 7, wherein the second identity provider application executes on a third computing device.

16. A method comprising:
  receiving, by a first identity provider application executing on a first computing device and from a second computing device, an authentication request;
  sending, to a second identity provider application, a first indication of the authentication request;
  receiving, from the second identity provider application, a second indication that a user has been authenticated based on a second authentication protocol, wherein the second indication comprises data identifying one or more first functions used to authenticate the user as part of the second authentication protocol;
  retrieving, from a storage device, session information associated with authentication, by the second identity provider application and based on the second authentication protocol, of the user;
  determining a first level of security based on the one or more first functions used to authenticate the user as part of the second authentication protocol;
  determining a plurality of second functions of a different authentication protocol for authenticating the user;
  determine a second level of security based on the plurality of second functions;
  determining, based on the difference between the one or more first functions of the first authentication protocol and the plurality of second functions, wherein the first level of security is different from the second level of security, and based on determining that at least a portion of the one or more first functions of the first authentication protocol satisfy the second level of security associated with the different authentication protocol, a subset of the plurality of second functions of the first authentication protocol for authenticating the user; and
  authenticating, by the first identity provider application, based on the session information, and by performing the subset of the plurality of second functions of the first authentication protocol, the user based on the first authentication protocol.

17. The method of claim 16, wherein sending the first indication of the authentication request comprises:
  causing the second computing device to access a URL associated with the second identity provider application.

18. The method of claim 16, wherein authenticating the user comprises:
  generating, based on the session information, a token; and
  sending, to the second computing device, the token.

19. The method of claim 16, further comprising:
  deleting, after authenticating the user, the session information.

20. The method of claim 16, wherein sending the first indication of the authentication request comprises:
  storing, based on the authentication request, the session information in the storage device, wherein the second identity provider application is configured to modify the session information after authenticating the user based on the second authentication protocol.

* * * * *